(12) United States Patent
Das et al.

(10) Patent No.: US 9,495,623 B1
(45) Date of Patent: Nov. 15, 2016

(54) ADAPTIVE OPTIMIZATION OF SUPER RESOLUTION ENCODING (SRE) PATTERNS BY HIERARCHICAL SELF-ORGANIZED PATTERN MAP (HSOPM) AND SYNTHESIS OF TRAVERSAL (SOT)

(71) Applicant: Xerox Corporation, Norwalk, CT (US)

(72) Inventors: Apurba Das, West Bengal (IN); Ranita Bej, West Bengal (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/800,989

(22) Filed: Jul. 16, 2015

(51) Int. Cl.
| | | |
|---|---|---|
| *G06F 15/00* | (2006.01) | |
| *G06K 15/02* | (2006.01) | |
| *H04N 19/33* | (2014.01) | |
| *H04N 19/119* | (2014.01) | |
| *H04N 19/96* | (2014.01) | |
| *H04N 19/129* | (2014.01) | |

(52) U.S. Cl.
CPC .......... *G06K 15/1873* (2013.01); *H04N 19/119* (2014.11); *H04N 19/129* (2014.11); *H04N 19/33* (2014.11); *H04N 19/96* (2014.11)

(58) Field of Classification Search
None
See application file for complete search history.

(56) References Cited

U.S. PATENT DOCUMENTS

| | | |
|---|---|---|
| 7,583,412 B2 | 9/2009 | McElvain et al. |
| 7,920,293 B2 | 4/2011 | McElvain et al. |
| 8,189,237 B2 | 5/2012 | McElvain |
| 8,553,286 B2 | 10/2013 | Williams |
| 8,781,253 B2 | 7/2014 | Bhaskaranand et al. |
| 2014/0036316 A1* | 2/2014 | Lin ..................... H04N 19/94 358/3.23 |
| 2014/0254950 A1 | 9/2014 | Blurfrushan et al. |

* cited by examiner

*Primary Examiner* — Helen Q Zong
(74) *Attorney, Agent, or Firm* — Kermit D. Lopez; Luis M. Ortiz; Ortiz & Lopez, PLLC

(57) ABSTRACT

Methods, systems, and computer-program products for optimizing SRE (Super Resolution Encoding) patterns. A hierarchical self-organizing pattern map (HSOPM) of SRE patterns can be derived, which illustrates interrelationships between consecutive SRE patterns. Such a hierarchical self-organizing map provides a first level of hierarchy, a second level of hierarchy, etc. Different weights can be assigned to different synthesis of traversal (SoT) according to the second level of hierarchy. The likelihood of the SRE patterns can then be calculated based on a fitness of continuity and the different weights, so as to subsequently select and encode an allowed number of the SRE patterns while replacing other patterns with a lower likelihood value with an immediate root and thereby adaptively optimize any number of the SRE patterns with respect to any number of values.

20 Claims, 5 Drawing Sheets

ADAPTIVE OPTIMIZATION OF SUPER RESOLUTION ENCODING (SRE) PATTERNS BY HIERARCHICAL SELF-ORGANIZED PATTERN MAP (HSOPM) AND SYNTHESIS OF TRAVERSAL (SOT)

TECHNICAL FIELD

Embodiments are generally related to the field of data compression, delivery, and rendering. Embodiments further relate to data encoding methods pertaining to pattern specification and rendering in display and printing devices. Embodiments also relate to SRE (Super Resolution Encoding), a rendering mode whereby a set of high-resolution binary patterns can be generated from a lower resolution "code".

BACKGROUND OF THE INVENTION

SRE is a technique for achieving high-resolution quality text and graphics. In SRE applications, high-resolution patterns are encoded as gray pixel values at lower resolution and then decoded on the IOT (Image Output Terminal) sometimes also referred to as a print engine module. In this case, the pixel tag (e.g., rendering hints) directs the IOT to decode the intensity plane while considering the same as an encoded pattern. The basic concept of SRE was developed to realize higher-resolution patterns even from lower resolution buffer data.

SRE can function as a filter and offers better filtering capabilities than, for example, anti-aliasing filters, to address the "jagging" problem along the edges of an object, particularly for tiny or down-sampled text and graphics. This approach uses the IOT capability of printing in, for example, 2400 DPI. For the classical SRE used in FFPS, the edge patterns along the 4 sub-pixels in intermediate 1200 DPI raster (which are actually in combination representing 1 pixel in 600 DPI) are encoded. The intensity array of color separation (e.g., K 100%) is replaced with encoded pattern value and the corresponding tag holds a unique value to declare that pixel as an SRE pattern rather than a value of intensity.

The IOT, at the end, can decode the pattern and print accurate pattern in 1200 DPI even from 600 DPI data. In 1200 DPI, i.e., 4 sub-pixels from 1 pixel of 600 DPI, we can have total $2^4=16$ patterns. The intensity array for each of the color separation of each of the pixel is represented by 1 byte, i.e., 8 bits. Therefore $2^8=256$ patterns can be realized, at the most. In 1200 DPI, for example, the number of patterns (16) is well fitted into the available patterns (256).

In order to achieve even better edge accuracy and utilize the IOT even more effectively, it would be desirable to achieve 2400 DPI pattern. However, each pixel in 600 DPI forms 16 sub-pixels in 2400 DPI. Hence, this results in $2^{16}=65536$ number of patterns or distinct encoded values. This new number ($2^{16}=65536$) is significantly higher than the allowed number of encoded patterns ($2^{16}=65536$) to be represented in 600 DPI intensity array.

The present inventors believe that a solution as discussed in greater detail herein involves the implementation of an adaptive approach for optimizing, for example, the most suitable or likely patterns from the available 65536 patterns to fit into an allowed number of encoded values (e.g., 256 for 8 bit quantization and 1024 for 10 bit quantization).

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved data compression, delivery, and rendering methods, systems, and computer-program products.

It is another aspect of the disclosed embodiments to provide for an improved data encoding method, system, and computer-program product pertaining to pattern specification and rendering in display and printing devices.

It is yet another aspect of the disclosed embodiments to provide for improved SRE (Super Resolution Encoding) applications.

It is still another aspect of the disclosed embodiments to provide for methods, systems, and computer-program products for optimizing SRE patterns.

It is also another aspect of the disclosed embodiments to render optimized SRE patterns.

The aforementioned aspects and other objectives and advantages can now be achieved as described herein. Methods, systems, and computer-program products are disclosed for optimizing SRE patterns. A hierarchical self-organizing pattern map of SRE patterns can be derived, which illustrates interrelationships between consecutive SRE patterns. Such a hierarchical self-organizing map provides a first level of hierarchy, a second level of hierarchy, etc. Different weights can be assigned to different synthesis of traversal according to the second level of hierarchy. The hierarchical self-organizing pattern map is configured with a tree-like hierarchical structure that indicates the accountability of each child node of each level to a root thereof in terms of self-organization.

The likelihood of the SRE patterns can then be calculated based on a fitness of continuity and the different weights, so as to subsequently select and encode an allowed number of the SRE patterns while replacing other patterns with a lower likelihood value with an immediate root and thereby adaptively optimize any number of the SRE patterns with respect to any number of values. Calculating the likelihood of the SRE patterns involves judging the connectivity between pixels in the SRE patterns The disclosed approach thus involves an SOT (Synthesis of Traversal) technique that utilizes SRE encoding for improved edges and smoothing in, for example, high-resolution scanning and other rendering applications. Such an approach can provide a knowledge-based weight for traversal through multiple pixels based on the edge pattern.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Figure 1:
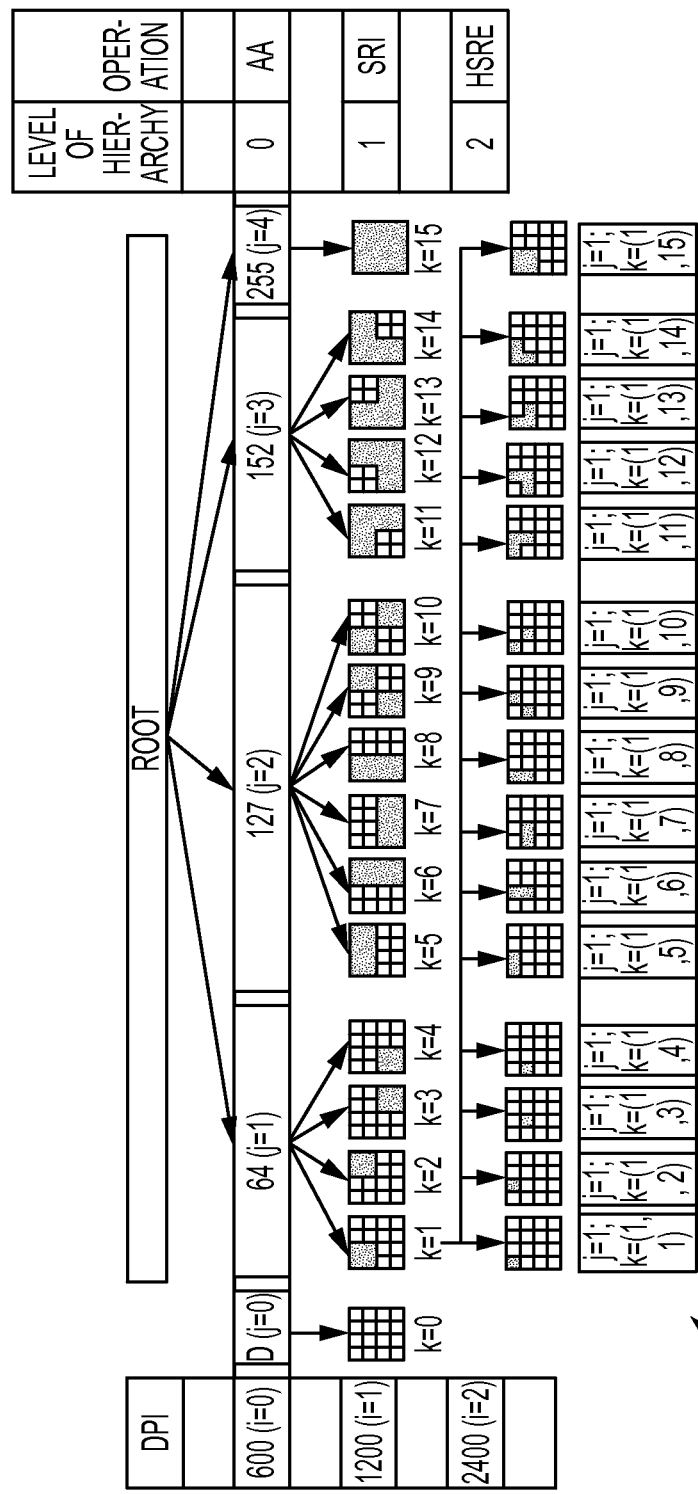
FIG. 1 illustrates a schematic diagram of a Hierarchical Self-Organizing Pattern Map (HSOPM) depicting the interrelationship between respective SRE patterns, in accordance with a preferred embodiment.
Figure 2A:
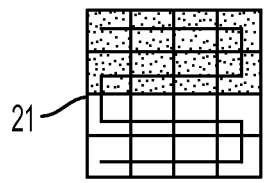
FIGS. 2A-F illustrate a schematic diagram depicting an example of SOT (Synthesis of Traversal), in accordance with a preferred embodiment.
Figure 2B:
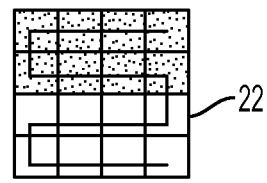
Figure 2C:
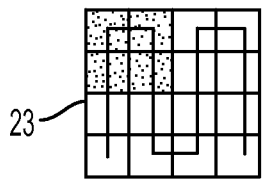
Figure 2D:
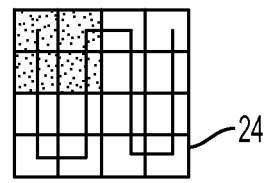
Figure 2E:
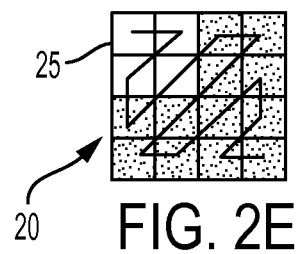
Figure 2F:
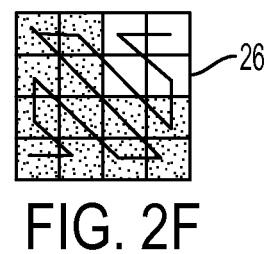

FIG. 1 illustrates a schematic diagram of a Hierarchical Self-Organizing Pattern Map (HSOPM) 10 depicting the interrelationship between respective SRE patterns, in accordance with a preferred embodiment. As indicated previously, it is one objective of the disclosed embodiments to optimize the number of patterns to the available (or allowable) encoded values. Optimization involves several stages.

The $1^{st}$ stage of the algorithm involves deriving a hierarchical self-organizing pattern map (HSOPM) to demonstrate the interrelationships between the consecutive patterns. As depicted in FIG. 1, the single target pixel in 600 DPI is considered at the root. This is a pixel with high tendency of "jagging" artifact due to edge occupancy and small size or down sampling. With respect to the relative occupancy of object in 1200 DPI sub-pixel region (4 sub pixels from 1 pixel), simple averaging can be accomplished. For the ease of illustration, an assumption can be made of a 100% black object on white background.

This method of simple averaging is known as anti-aliasing (AA) filter. At level 0 ($i=0$), with respect to the relative occupancy of black sub-pixels, 4 classes (child nodes) are formed as "no occupancy" or 0 ($j=0$), "1/4 occupancy" or 64 ($j=1$), "2/4 occupancy" or 127 ($j=2$), "3/4 occupancy" or 192 ($j=3$), and "whole occupancy" or 255 ($j=4$). The AA filter actually blurs the edges and creates an illusion of smooth edge. A close examination can easily expose the illusion, as the patterns are not the same even though the relative occupancies are same. In the next level (level 1) of hierarchy ($i=1$), the actual patterns are shown as children of $j=0, 1, 2, 3, 4$.

As an example, $j=2$ is presenting 2/4 occupancy for all child nodes, but the pattern represented by $k=5$ and $k=7$ are most likely parts of a horizontal line, $k=6$ and $k=8$ are most likely parts of a vertical line, and $k=9$ and $k=10$ are parts of slant lines or ramps of opposite angles. Hence, they should not be simply considered as only one pattern.

Hence, this level of hierarchy ($i=1$) is the level of super resolution encoding in 1200 DPI. For $i=1$, $k=1$ to 15 we should encode the patterns by 8 bit encoding process. It is easily understandable that $j=0,i=0,k=0$ need not to be considered as SRE pattern as no valid occupancy is found in that pattern. Finer patterns can be seen at the next level of hierarchy ($i=2$) representing 2400 DPI patterns (Level 2) where each pixel in 600 DPI (Level 0) form 16 sub-pixels in 2400 DPI.

As depicted in FIG. 1, only the children of $k=1$ is expanded. The pattern (level 1) in $k=1$ represents northwest occupancy of the pixel(s). At level 2, we have considered $k=1$ pattern inside $k=1$ to form $k=(1,1)$. Similarly, considered $k=2$ (north-east) into $k=1$ to form $k=(1,2)$ and so on. Similarly 2/4 occupancy inside 1/4 occupancy has been depicted through $k=(1,5) \ldots (1,10)$ and 3/4 occupancy inside 1/4 occupancy has been depicted through $k=(1,11) \ldots (1,15)$ and so on.

It can thus be seen that the whole occupancy inside 1/4 is self-repeating $k=15$. That is, "$i=2, j=1, k=(1,15)$" is exactly the same pattern as "$i=1, j=4, k=15$". This was in each sub-level of the hierarchy; we would get 1 (one) self-repeating pattern. This complete pattern map can be referred to as a Hierarchical Self-Organizing Pattern Map (HSOPM). The total number of pattern=$2^{16}$=65536 can be realized, for example, in the following manner:

1. For $j=1$, $i=2$, number of pattern for each k is 15. For "$i=1, j=1$", total number of $k=4$. Hence total pattern=$4 \times 15-4=56$.
2. For $j=2$, $i=2$, number of pattern for each k is $15 \times 15$. "$i=1, j=2$", total number of $k=6$. Hence total pattern=$6 \times \text{pow}(15,j)-6=1344$.
3. For $j=3$, $i=2$, number of pattern for each k is $15 \times 15 \times 15$. "$i=1, j=3$", total number of $k=4$. Hence total pattern=$4 \times \text{pow}(15,j)-4=13496$.
4. For $j=4$, $i=2$, number of pattern for each k is $15 \times 15 \times 15 \times 15$. "$i=1, j=4$", total number of $k=1$. Hence total pattern=$\text{pow}(15,j)-1=50624$.
5. For $i=1$, we have a total 16 patterns Hence altogether we have total number of patterns through HSOPM:

$$\aleph = 16 + \sum_{j=1}^{4} \alpha_j(15^j - 1), \text{ where} \quad [1]$$

$$\alpha_1 = \alpha_3 = 4; \alpha_2 = 6; \alpha_4 = 1$$

$$= 4(15^1 - 1) + 6(15^2 - 1) + 4(15^3 - 1) + (15^4 - 1) + 16 = 65536$$

Turning now to the second stage, it should be noted that the first stage of the proposed algorithm has actually arranged the total number of patterns in an organized manner (i.e., HSOPM). The optimization concern, however, has not yet been addressed. To address this issue, the concept of "synthesis of traversal" (SOT) is introduced, as depicted in the schematic diagrams 20 of FIGS. 2A-F, in accordance with a preferred embodiment. A variety of pixel configurations 21, 22, 23, 24, 25, and 26 are shown in FIGS. 2A-F. As shown in the FIGS. 2A-F, the 16 sub-pixels in the 2400 DPI SRE, the pixels can be traversed according to a number of example approaches:

1. Horizontal (pixel configurations 21, 22)
2. Vertical (pixel configurations 23, 25)
3. Diagonal (pixel configurations 26, 26)

The main objective is to judge connectivity between pixels. The connected patterns are more likely than the unconnected patterns, statistically. According to the Level 1 pattern (or the immediate parent node) against the "i=2" patterns, three different weights would be assigned to the traversals. As we are synthesizing (pseudo-synthesis) the 2400 DPI patterns from 1200 DPI patterns, those are called "synthesis of traversal".

The patterns in 2400 DPI (i=2) are inherited or synthesized from patterns in 1200 DPI (i=1). The parent can determine the weights of "synthesis of traversal" as follows as shown in Table 1 below.

TABLE 1

| Value of k (i = 1) | Horizontal weight, $w_h$ | Vertical weight, $w_v$ | Diagonal weight, $w_d$ |
|---|---|---|---|
| 1 | 0.33 | 0.33 | 0.33 |
| 2 | 0.33 | 0.33 | 0.33 |
| 3 | 0.33 | 0.33 | 0.33 |
| 4 | 0.33 | 0.33 | 0.33 |
| 5 | 0.5 | 0.2 | 0.3 |
| 6 | 0.2 | 0.5 | 0.3 |
| 7 | 0.5 | 0.2 | 0.3 |
| 8 | 0.2 | 0.5 | 0.3 |
| 9 | 0.25 | 0.25 | 0.5 |
| 10 | 0.25 | 0.25 | 0.5 |
| 11 | 0.25 | 0.25 | 0.5 |
| 12 | 0.25 | 0.25 | 0.5 |
| 13 | 0.25 | 0.25 | 0.5 |
| 14 | 0.25 | 0.25 | 0.5 |
| 15 | 0.33 | 0.33 | 0.33 |

The assigned weights are determined from the 1200 DPI patterns. Refer to FIG. 1 and Table 1 above for explanation.

Now, we turn our attention to the third stage. To measure continuity in the pattern, we can focus on two different aspects of the children patterns (each of 65536 the patters) as follows:

1. The average run length according to SOT (x)
2. The number of breaks with respect to SOT (β)

The final value of the likelihood (p) would be determined by the following equation:

$$\rho = \sum_{\varepsilon \in \{h,v,d\}} w_\varepsilon \left( \overline{X}_\varepsilon + \frac{1}{\overline{\beta}_\varepsilon} \right) \quad [2]$$

Figure 3A:
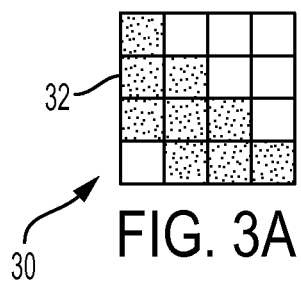
FIGS. 3A-B illustrate two SRE patterns for likelihood calculation, in accordance with an example embodiment.
Figure 3B:
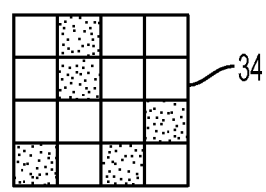

FIGS. 3A-B illustrate two example SRE patterns, in accordance with example embodiments. FIGS. 3A-B and the calculation of the likelihood (p) are discussed below. The first example pattern is shown on the left side as FIG. 3A and the second example pattern is shown on the right side as FIG. 3B. The child pattern in 2400 DPI is a child of the pattern k=13 at i=1. Hence, the weights would be as follows (e.g., according to Table 1):

$$w_h = w_v = 0.25; w_d = 0.5.$$

The likelihood equation from SOT (Eq. 2)

$$\rho = \sum_{\varepsilon \in \{h,v,d\}} w_\varepsilon \left( \overline{X}_\varepsilon + \frac{1}{\overline{\beta}_\varepsilon} \right).$$

Following SOT as depicted in 2a, $$\overline{X}_{h1} = \left( \frac{1+5+3}{3} \right) = 3; \overline{\beta}_{h1} = 6.$$

Therefore, $$\frac{\rho_{h1}}{w_h} = \left( \overline{X}_{h1} + \frac{1}{\overline{\beta}_{h1}} \right) = 3.167.$$

Following SOT as depicted in 2b, $$\overline{X}_{h2} = \left( \frac{3+3+3}{3} \right) = 3; \overline{\beta}_{h2} = 6.$$

Therefore, $$\frac{\rho_{h2}}{w_h} = \left( \overline{X}_{h2} + \frac{1}{\overline{\beta}_{h2}} \right) = 3.167.$$

As $$\frac{\rho_{h1}}{w_h} = \frac{\rho_{h2}}{w_h},$$

both horizontal SOTs are the same. Therefore, $$\rho_h = w_h \left( \overline{X}_h + \frac{1}{\overline{\beta}_h} \right) = 0.25 \times 3.167 = 0.79175$$

[otherwise we would take the $\rho_h = \text{Max}(\rho_{h1}, \rho_{h2})$].

Following SOT as depicted in 2c, $$\overline{X}_{v1} = \left(\frac{3+3+3}{3}\right) = 3; \overline{\beta}_{v1} = 6.$$

Therefore, $$\frac{\rho_{v1}}{w_v} = \left(\overline{X}_{v1} + \frac{1}{\overline{\beta}_{v1}}\right) = 3.167.$$

Following SOT as depicted in 2d, $$\overline{X}_{v1} = \left(\frac{3+5+1}{3}\right) = 3; \overline{\beta}_{v1} = 6.$$

Therefore, $$\frac{\rho_{v2}}{w_v} = \left(\overline{X}_{v2} + \frac{1}{\overline{\beta}_{v2}}\right) = 3.167.$$

As $$\frac{\rho_{v1}}{w_v} = \frac{\rho_{v2}}{w_v},$$

both horizontal SOTs are the same. Therefore $$\rho_v = w_v\left(\overline{X}_v + \frac{1}{\overline{\beta}_v}\right) = 0.25 \times 3.167 = 0.79175.$$

Following SOT as depicted in 2e, $$\overline{X}_{d1} = \left(\frac{1+3+1+2+2}{5}\right) = 1.8; \overline{\beta}_{d1} = 9.$$

Therefore, $$\frac{\rho_{d1}}{w_d} = \left(\overline{X}_{d1} + \frac{1}{\overline{\beta}_{d1}}\right) = 1.91.$$

Following SOT as depicted in 2f, $$\overline{X}_{d2} = \left(\frac{9}{1}\right) = 9; \overline{\beta}_{d2} = 3.$$

Therefore, $$\frac{\rho_{d2}}{w_d} = \left(\overline{X}_{d2} + \frac{1}{\overline{\beta}_{d2}}\right) = 9.33. \text{ As} \frac{\rho_{d2}}{w_d} > \frac{\rho_{d1}}{w_d},$$

$$\rho_d = w_d\left(\overline{X}_d + \frac{1}{\overline{\beta}_d}\right) = 0.5 \times 9.33 = 4.67.$$

Hence, the total likelihood=0.79+0.79+4.67=6.25.

In the second example shown as FIG. 3B, the child pattern in 2400 DPI is a child of the pattern k=13 at i=1. Hence, the weights would be as follows (following Table 1):

$$w_h = w_v = 0.25; w_d = 0.5.$$

The likelihood equation from SOT (Eq. 2)

$$\rho = \sum_{\varepsilon \in \{h,v,d\}} w_\varepsilon\left(\overline{X}_\varepsilon + \frac{1}{\overline{\beta}_\varepsilon}\right).$$

Following SOT as depicted in 2a, $$\overline{X}_{h1} = \left(\frac{1+1+1+1+1}{5}\right) = 1; \overline{\beta}_{h1} = 10.$$

Therefore, $$\frac{\rho_{h1}}{w_h} = \left(\overline{X}_{h1} + \frac{1}{\overline{\beta}_{h1}}\right) = 1.1.$$

Following SOT as depicted in 2b, $$\overline{X}_{h2} = \left(\frac{1+1+1+1+1}{5}\right) = 1; \overline{\beta}_{h2} = 11.$$

Therefore, $$\frac{\rho_{h2}}{w_h} = \left(\overline{X}_{h2} + \frac{1}{\overline{\beta}_{h2}}\right) = 1.09. \text{ As} \frac{\rho_{h1}}{w_h} > \frac{\rho_{h2}}{w_h}.$$

Therefore $$\rho_h = w_h\left(\overline{X}_h + \frac{1}{\overline{\beta}_h}\right) = 0.25 \times 1.1 = 0.275.$$

Following SOT as depicted in 2c, $$\overline{X}_{v1} = \left(\frac{1+2+1+1}{4}\right) = 1.25; \overline{\beta}_{v1} = 8.$$

Therefore, $$\frac{\rho_{v1}}{w_v} = \left(\overline{X}_{v1} + \frac{1}{\overline{\beta}_{v1}}\right) = 1.375.$$

Following SOT as depicted in 2d $$\overline{X}_2 = \left(\frac{1+2+1+1}{4}\right) = 1.25; \overline{\beta}_{v2} = 9.$$

Therefore, $$\frac{\rho_{v2}}{w_v} = \left(\overline{X}_{v2} + \frac{1}{\overline{\beta}_{v2}}\right) = 1.36. \text{ As} \frac{\rho_{v1}}{w_v} > \frac{\rho_{v2}}{w_v}.$$

Therefore $$\rho_v = w_v\left(\overline{X}_v + \frac{1}{\overline{\beta}_v}\right) = 0.25 \times 1.375 = 0.3437.$$

Following SOT as depicted in 2e, $$\overline{X}_{d1} = \left(\frac{1+1+1+2}{4}\right) = 1.25; \overline{\beta}_{d1} = 9.$$

Therefore, $$\frac{\rho_{d1}}{w_d} = \left(\overline{X}_{d1} + \frac{1}{\overline{\beta}_{d1}}\right) = 1.36.$$

Following SOT as depicted in 2f, $$\overline{X}_{d2} = \left(\frac{1+1+1+1+1}{5}\right) = 1; \overline{\beta}_{d2} = 10.$$

Therefore, $$\frac{\rho_{d2}}{w_d} = \left(\overline{X}_{d2} + \frac{1}{\overline{\beta}_{d2}}\right) = 1.1. \text{ As} \frac{\rho_{d2}}{w_d} < \frac{\rho_{d1}}{w_d},$$

$$\rho_d = w_d\left(\overline{X}_d + \frac{1}{\overline{\beta}_d}\right) = 0.5 \times 1.36 = 0.685.$$

Hence the total likelihood=0.275+0.3437+0.685=1.3037.

It can be clearly observed that in competition the likelihood clearly distinguishes the patterns and in optimization the pattern shown as FIG. 3A would win over the pattern shown as FIG. 3B.

The pattern with respect to the likelihood (Equations 1 and 2) can be sorted and the allowed number of encoded values taken. If accidentally, the same likelihood is obtained and a "tie" is obtained, the "number of pixels" tiebreaker can be considered as additional constraint for fine-tuning. In that case, the pattern with more number of pixels (black, according to this example) would win.

The disclosed approach is thus flexible enough to be used in a generic implementation for optimization problems of this type. If a new printing system or document image processing system utilizes 10-bit quantization for the intensity of each color separation, for example, 216 patterns can be suitably fitted into 210 levels without the loss of generality.

Figure 4:
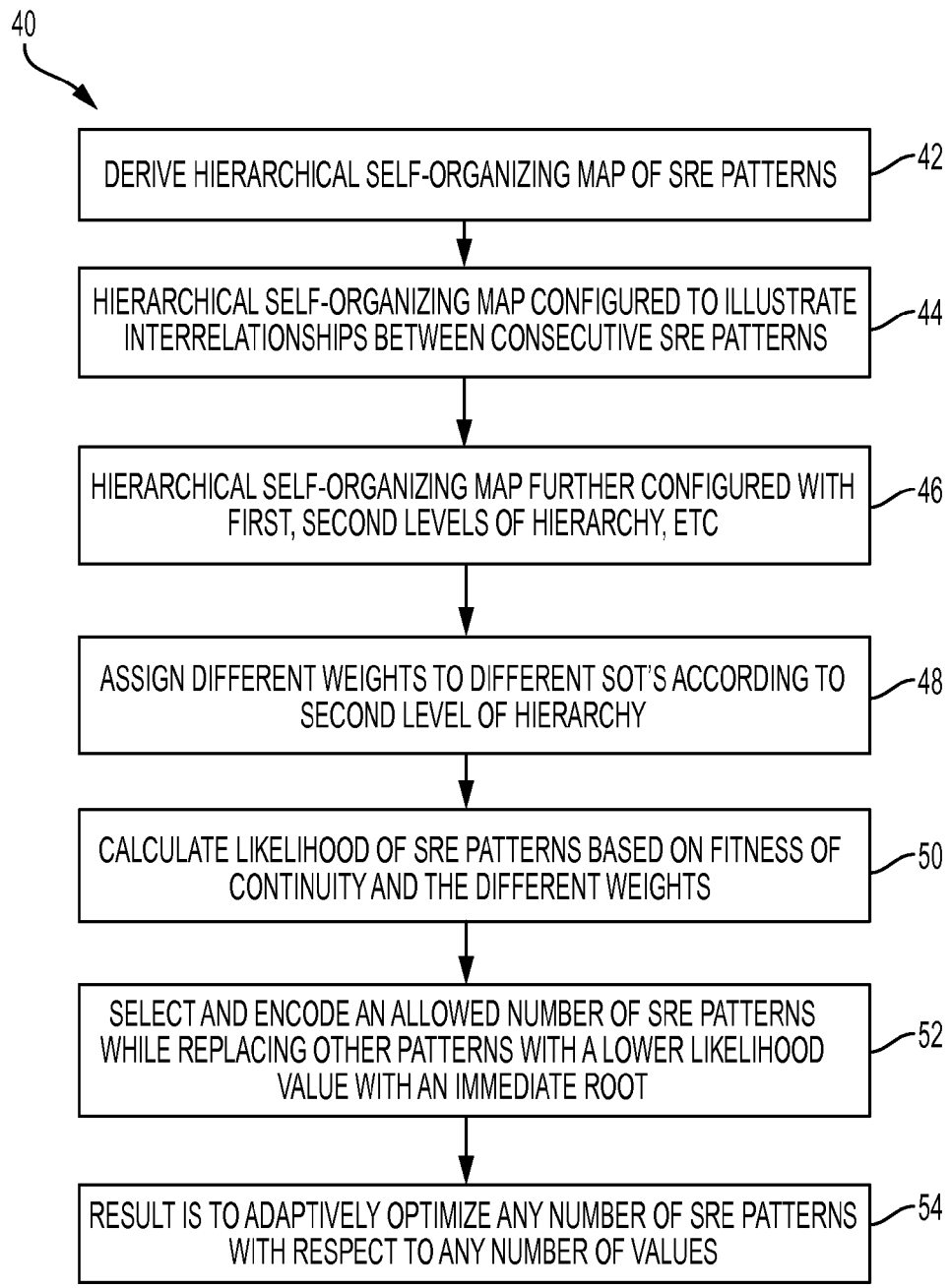
FIG. 4 illustrates a high-level flow chart depicting logical operational steps of a method for adaptively optimizing SRE patterns by HSOPM and SOT, in accordance with an alternative embodiment.

FIG. 4 illustrates a high-level flow chart depicting logical operational steps of a method 40 for adaptively optimizing SRE patterns by HSOPM and SOT, in accordance with an alternative embodiment. As indicated at block 42, a step or logical operation can be implemented to derive a hierarchical self-organizing pattern map (e.g., HSOPM) of SRE patterns. As illustrated at block 44, such a hierarchical self-organizing pattern map can be configured to illustrate interrelationships between consecutive SRE patterns. As shown at block 46, the hierarchical self-organizing map can be further configured a first level of hierarchy, a second level of hierarchy, etc. Note that the hierarchical self-organizing pattern map can also be configured with a tree-like hierarchical structure that indicates the accountability of each child node of each level to a root thereof in terms of self-organization.

Thereafter, as depicted at block 48, a step or logical operation can be implemented to assign, according to the second level of hierarchy, different weights to different SOTs. Thereafter, as indicated at block 50, a step or operation can be implemented to calculate the likelihood of the SRE patterns based on a fitness of continuity and the different weights. Note that the step or operation of calculating the likelihood of the SRE patterns involves judging the connectivity between pixels in the SRE patterns.

The operation depicted at block 50 can be implemented so as to subsequently select and encode an allowed number of the SRE patterns while replacing other patterns with a lower likelihood value with an immediate root, as described at block 52. The result is that any number of the SRE patterns can be adaptively optimized with respect to any number of values, as illustrated at block 54.

Figure 5:
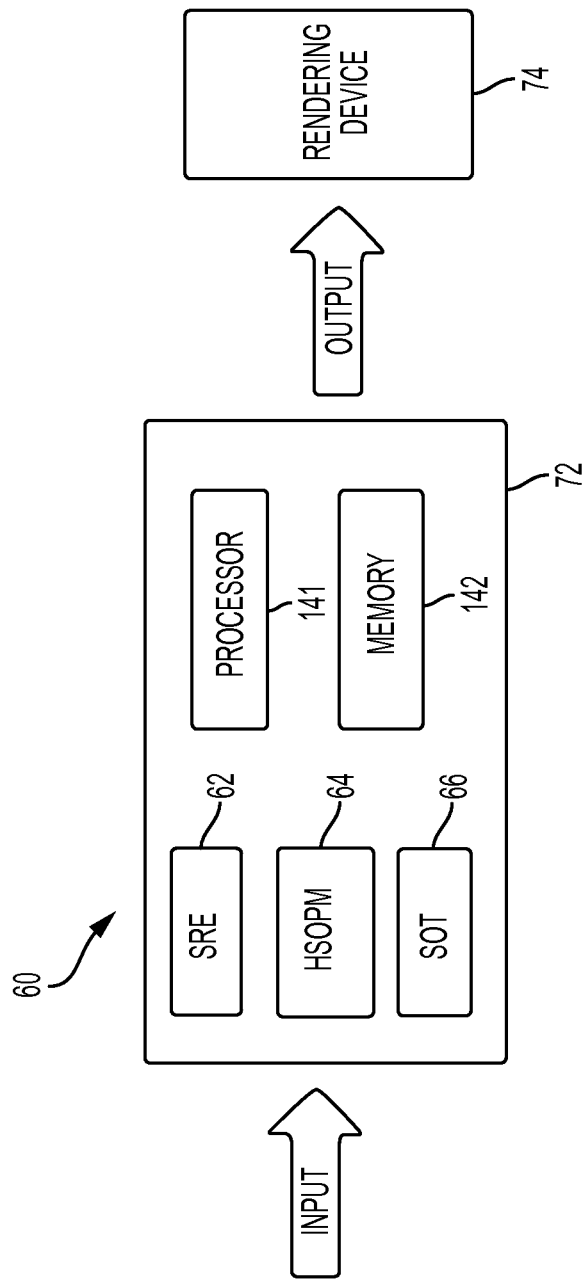
FIG. 5 illustrates a block diagram of a system for adaptively optimizing SRE patterns by HSOPM and SOT, in accordance with an alternative embodiment.

FIG. 5 illustrates a block diagram of a system 60 for adaptively optimizing SRE patterns by HSOPM and SOT, in accordance with an alternative embodiment. The system 60 generally includes an SRE optimization platform 72 that includes an SRE module 62 for implementing SRE pattern operations as described herein. The SRE optimization platform 72 also includes an HSOPM module 64, which can be implemented to generate an HSOPM as discussed and depicted herein, an SOT module 66 for performing SOT operations, which are also illustrated and described herein. The optimization platform 72 further includes a processor 141 and a memory 142. Data is thus input to the optimization platform 72 and output for rendering to a rendering device 74 (e.g., a printer, scanner, photocopy machine, and the so on).

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 6:
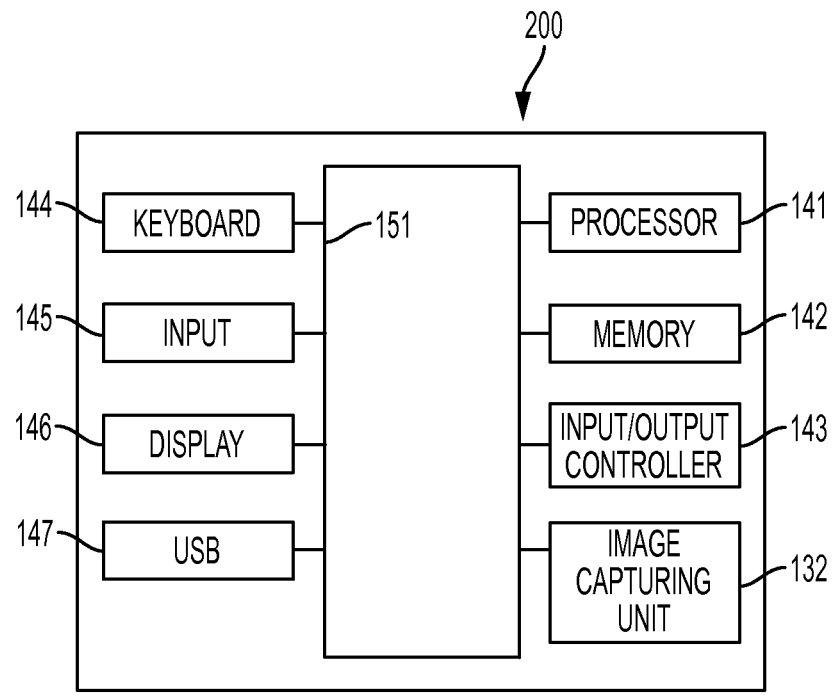
FIG. 6 illustrates a schematic view of a computer system, in accordance with an embodiment.
Figure 7:
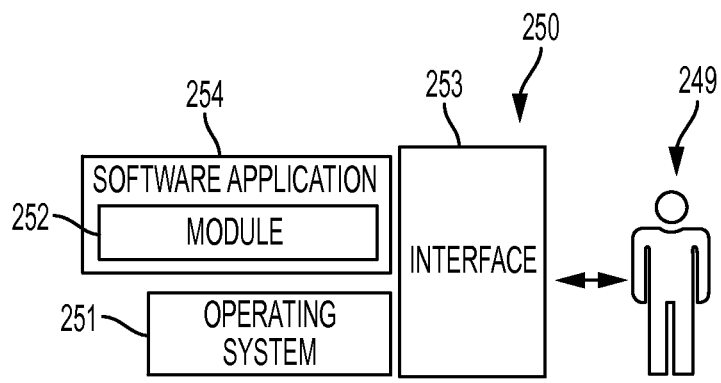
FIG. 7 illustrates a schematic view of a software system including a module, an operating system, and a user interface, in accordance with an embodiment.

FIGS. 6-7 are provided as exemplary diagrams of data-processing environments in which embodiments of the present invention may be implemented. It should be appreciated that FIGS. 6-7 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 6, some embodiments may be implemented in the context of a data-processing system 200 that includes, for example, a processor 141 such as a CPU, a memory 142, an input/output controller 143, an image capturing unit or camera(s) 132, a keyboard 144, an input device 145 (e.g., a pointing device, such as a mouse, track ball, and pen device, etc.), a display 146, and a USB (Universal Serial Bus) peripheral connection 147. As illustrated, the various components of data-processing system 200 can communicate electronically through a system bus 151 or similar architecture. The system bus 151 may be, for example, a subsystem that transfers data between, for example, computer components within data-processing system 200 or to and from other data-processing devices, components, computers, etc.

It can be appreciated that some of the components shown in FIG. 6 are optional and desirable only in certain situations. For example, the image-capturing unit 132 may or may not be included with data-processing system 200, but may be desirable in the case of, for example, Smartphone or laptop computer implementations, which often include a video camera. In other embodiments, for example, the data-processing system 200 can function as a server in a client-server network. In some embodiments, the image-capturing unit 132 can be used for acquiring images of documents, graphics, etc., in the context of a scanner, photocopy machine, and so on.

FIG. 7 illustrates a computer software system 250 for directing the operation of the data-processing system 200 depicted in FIG. 6. Software application 254, stored, for example, in memory 142, generally includes a kernel or operating system 251 and a shell or interface 253. One or more application programs, such as software application 254, may be "loaded" (i.e., transferred from, for example, a mass storage or other memory location into the memory 142) for execution by the data-processing system 200. The data-processing system 200 can receive user commands and data through an interface 253; these inputs may then be acted upon by the data-processing system 200 in accordance with instructions from operating system 251 and/or software application 254. The interface 253 in some embodiments can serve to display results, whereupon a user 249 may supply additional inputs or terminate a session. The software application 254 can include a module 252 that implements instructions or logical operations such as those shown in, for example, and described herein with respect to FIGS. 1-4 and/or modules such as those shown, for example, in FIG. 5.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The SRE module 62, the HSOPM module 64, the SOT module 66, and so on shown in FIG. 5 are examples of modules.

The module 252 shown in FIG. 7 can thus implement instructions such as those shown and described and illustrated herein with respect to, for example, blocks 42, 44, 46, 48, 50, 52 of FIG. 4 and the various operations and steps/instructions discussed herein with respect to FIGS. 1, 2, and 3 and so on. It can be appreciated, however, that such blocks/operations are not limiting features of the disclosed embodiments. Other operations can be implemented with or in lieu of such instructions/operations.

FIGS. 6-7 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms and operating systems, including, for example, OS, Mac, Windows, UNIX, LINUX, and the like.

Based on the foregoing, it can be appreciated that a number of embodiments, preferred and alternative, are disclosed herein. For example, in one embodiment, a method for optimizing SRE patterns is disclosed. Such a method can include, for example, the steps or logical operations of deriving a hierarchical self-organizing pattern map of SRE patterns that illustrates interrelationships between consecutive SRE patterns, the hierarchical self-organizing map providing at least a first level of hierarchy and a second level of hierarchy; assigning according to the second level of hierarchy different weights to different synthesis of traversal; and calculating a likelihood of the SRE patterns based on a fitness of continuity and the different weights so as to subsequently select and encode an allowed number of the SRE patterns while replacing other patterns with a lower likelihood value with an immediate root and thereby adaptively optimize any number of the SRE patterns with respect to any number of values.

In another embodiment, a step or logical operation can be provided for configuring the hierarchical self-organizing pattern map with a tree-like hierarchical structure that indicates an accountability of each child node of each level to a root thereof in terms of self-organization. In yet another embodiment, the step or logical operation of calculating the likelihood of the SRE patterns can further involve judging connectivity between pixels in the SRE patterns. In still another embodiment, a step or logical operation can be implemented for measuring continuity in the SRE patterns in order to determine the fitness of continuity. In still another embodiment, a step or logical operation can be provided for measuring the continuity by analyzing two different aspects of children patterns with respect to the SRE patterns. The two different aspects of the children patterns can include, for example: an average run length according to a synthesis of traversal and the number of breaks with respect to a synthesis of traversal. In still another embodiment, a step or logical operation can be provided for rendering the SRE patterns via a rendering device after the any number of SRE patterns is adaptively optimized.

In another embodiment, a system for optimizing patterns can be implemented. Such a system can include, for example, one or more processors and a computer-usable medium embodying computer program code. The computer-usable medium is capable of communicating with the processor(s). The computer program code can include instructions executable by the processor(s) and configured, for example, for: deriving a hierarchical self-organizing pattern map of SRE patterns that illustrates interrelationships between consecutive SRE patterns, the hierarchical self-organizing map providing at least a first level of hierarchy and a second level of hierarchy; assigning according to the second level of hierarchy different weights to different synthesis of traversal; and calculating a likelihood of the SRE patterns based on a fitness of continuity and the different weights so as to subsequently select and encode an allowed number of the SRE patterns while replacing other patterns with a lower likelihood value with an immediate root and thereby adaptively optimize any number of the SRE patterns with respect to any number of values.

In some embodiments, such instructions can be further configured for arranging the hierarchical self-organizing pattern map with a tree-like hierarchical structure that indicates an accountability of each child node of each level to a root thereof in terms of self-organization. In another embodiment, the aforementioned instructions for calculating the likelihood of the SRE patterns can further include instructions for judging connectivity between pixels in the SRE patterns. The instructions can be further configured for measuring continuity in the SRE patterns in order to determine the fitness of continuity. In another embodiment, the instructions for measuring the continuity can further include instructions configured for analyzing two different aspects of children patterns with respect to the SRE patterns. In some embodiments, the two different aspects of the children patterns can include, for example: an average run length according to a synthesis of traversal and the number of breaks with respect to a synthesis of traversal. In yet another embodiment, the instructions can be further configured for rendering the SRE patterns via a rendering device after the any number of SRE patterns can be adaptively optimized.

In another embodiment, a computer program product comprising a non-transitory computer-readable storage medium with computer-executable instructions stored thereon, the computer-executable instructions causing a computer to optimize SRE patterns can be implemented by: deriving a hierarchical self-organizing pattern map of SRE patterns that illustrates interrelationships between consecutive SRE patterns, the hierarchical self-organizing map providing at least a first level of hierarchy and a second level of hierarchy; assigning according to the second level of hierarchy different weights to different synthesis of traversal; and calculating a likelihood of the SRE patterns based on a fitness of continuity and the different weights so as to subsequently select and encode an allowed number of the SRE patterns while replacing other patterns with a lower likelihood value with an immediate root and thereby adaptively optimize any number of the SRE patterns with respect to any number of values.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for optimizing SRE (Super Resolution Encoding) patterns, comprising:
   deriving a hierarchical self-organizing pattern map of
      SRE patterns that illustrates interrelationships between consecutive SRE patterns, said hierarchical self-organizing map providing at least a first level of hierarchy and a second level of hierarchy;

assigning according to said second level of hierarchy different weights to different synthesis of traversal; and calculating a likelihood of said SRE patterns based on a fitness of continuity and said different weights so as to subsequently select and encode an allowed number of said SRE patterns while replacing other patterns with a lower likelihood value with an immediate root and thereby adaptively optimize any number of said SRE patterns with respect to any number of values.

2. The method of claim 1 further comprising configuring said hierarchical self-organizing pattern map with a tree-like hierarchical structure that indicates an accountability of each child node of each level to a root thereof in terms of self-organization.

3. The method of claim 1 wherein said calculating said likelihood of said SRE patterns further comprises judging a connectivity between pixels in said SRE patterns.

4. The method of claim 1 further comprising measuring continuity in said SRE patterns in order to determine said fitness of continuity.

5. The method of claim 4 further comprising measuring said continuity by analyzing two different aspects of children patterns with respect to said SRE patterns.

6. The method of claim 5 wherein said two different aspects of said children patterns comprise: an average run length according to a synthesis of traversal and the number of breaks with respect to a synthesis of traversal.

7. The method of claim 1 further comprising rendering said SRE patterns via a rendering device after said any number of SRE patterns are adaptively optimized.

8. A system for optimizing SRE (Super Resolution Encoding) patterns, said system comprising:
at least one processor;
a non-transitory computer-usable medium embodying computer program code, said computer-usable medium capable of communicating with said at least one processor, said computer program code comprising instructions executable by said at least one processor and configured for:
deriving a hierarchical self-organizing pattern map of SRE patterns that illustrates interrelationships between consecutive SRE patterns, said hierarchical self-organizing map providing at least a first level of hierarchy and a second level of hierarchy;
assigning according to said second level of hierarchy different weights to different synthesis of traversal; and
calculating a likelihood of said SRE patterns based on a fitness of continuity and said different weights so as to subsequently select and encode an allowed number of said SRE patterns while replacing other patterns with a lower likelihood value with an immediate root and thereby adaptively optimize any number of said SRE patterns with respect to any number of values.

9. The system of claim 8 wherein said instructions are further configured for arranging said hierarchical self-organizing pattern map with a tree-like hierarchical structure that indicates an accountability of each child node of each level to a root thereof in terms of self-organization.

10. The system of claim 8 wherein said instructions for calculating said likelihood of said SRE patterns further comprises instructions for judging a connectivity between pixels in said SRE patterns.

11. The system of claim 8 wherein said instructions are further configured for measuring continuity in said SRE patterns in order to determine said fitness of continuity.

12. The system of claim 11 wherein said instructions for measuring said continuity further comprise instructions configured for analyzing two different aspects of children patterns with respect to said SRE patterns.

13. The system of claim 12 wherein said two different aspects of said children patterns comprise: an average run length according to a synthesis of traversal and the number of breaks with respect to a synthesis of traversal.

14. The system of claim 8 wherein said instructions are further configured for rendering said SRE patterns via a rendering device after said any number of SRE patterns are adaptively optimized.

15. A computer program product comprising a non-transitory computer-readable storage medium with computer-executable instructions stored thereon, said computer-executable instructions causing a computer to optimize SRE patterns by:
deriving a hierarchical self-organizing pattern map of SRE patterns that illustrates interrelationships between consecutive SRE patterns, said hierarchical self-organizing map providing at least a first level of hierarchy and a second level of hierarchy;
assigning according to said second level of hierarchy different weights to different synthesis of traversal; and
calculating a likelihood of said SRE patterns based on a fitness of continuity and said different weights so as to subsequently select and encode an allowed number of said SRE patterns while replacing other patterns with a lower likelihood value with an immediate root and thereby adaptively optimize any number of said SRE patterns with respect to any number of values.

16. The computer program product of claim 15 wherein said computer-executable instructions further comprise arranging said hierarchical self-organizing pattern map with a tree-like hierarchical structure that indicates an accountability of each child node of each level to a root thereof in terms of self-organization.

17. The computer program product of claim 15 wherein said calculating said likelihood of said SRE patterns further comprises judging a connectivity between pixels in said SRE patterns.

18. The computer program product of claim 15 wherein said computer-executable instructions further comprise measuring continuity in said SRE patterns in order to determine said fitness of continuity.

19. The computer program product of claim 15 wherein said computer-executable instructions further comprise measuring said continuity by analyzing two different aspects of children patterns with respect to said SRE patterns, wherein said two different aspects of said children patterns comprise: an average run length according to a synthesis of traversal and the number of breaks with respect to a synthesis of traversal.

20. The computer program product of claim 15 wherein said computer-executable instructions further comprise rendering said SRE patterns via a rendering device after said any number of SRE patterns are adaptively optimized.

* * * * *